(12) United States Patent
Oshikiri et al.

(10) Patent No.: US 6,699,953 B2
(45) Date of Patent: Mar. 2, 2004

(54) LENS MADE OF SYNTHETIC RESIN AND PROCESS FOR PRODUCING THE SAME

(75) Inventors: Tatsuya Oshikiri, Tokyo (JP); Yasushi Oyaizu, Tokyo (JP); Kenji Uno, Tokyo (JP)

(73) Assignee: Seed Co., Ltd., Tokyo (JP)

( * ) Notice: Subject to any disclaimer, the term of this patent is extended or adjusted under 35 U.S.C. 154(b) by 0 days.

(21) Appl. No.: 10/296,796

(22) PCT Filed: Sep. 4, 2001

(86) PCT No.: PCT/JP01/07641

§ 371 (c)(1),
(2), (4) Date: Nov. 26, 2002

(87) PCT Pub. No.: WO02/21165

PCT Pub. Date: Mar. 14, 2002

(65) Prior Publication Data

US 2003/0130461 A1 Jul. 10, 2003

(30) Foreign Application Priority Data

Sep. 7, 2000 (JP) ........................ 2000-271994
Jul. 13, 2001 (JP) ........................ 2001-213994

(51) Int. Cl.$^7$ ................................ C08F 12/30
(52) U.S. Cl. .................. 526/289; 526/286; 526/321; 526/323
(58) Field of Search ................. 526/286, 289, 526/321, 323

(56) References Cited

U.S. PATENT DOCUMENTS 6,479,606 B1 * 11/2002 Jiang et al. .................. 526/256

FOREIGN PATENT DOCUMENTS

| EP | 0598551 A2 * | 5/1994 |
|---|---|---|
| JP | 7-82376 A | 3/1995 |
| JP | 9-25321 A | 1/1997 |
| JP | 9-302040 A | 11/1997 |
| JP | 9-324023 A | 12/1997 |

\* cited by examiner

*Primary Examiner*—Helen L. Pezzuto
(74) *Attorney, Agent, or Firm*—Frommer Lawrence & Haug LLP; Ronald R. Santucci

(57) ABSTRACT

The present invention provides a material for optical lenses which not only sufficiently has properties such as impact resistance and dye-affinity essential for the optical lenses but also simultaneously attains a high refractive index, a high Abbe's number and a low specific gravity, and which is photopolymerizable.

The present invention further provides a lens made of a synthetic resin which is a copolymer obtained by copolymerizing a composition comprising 20 to 80% by weight of bis-2-methacryloylthioethyl sulfide represented by the following structural formula (1), 5 to 50% by weight of a bifunctional or multifunctional thiol and 0 to 75% by weight of a monomer copolymerizable with these compounds, and which has a refractive index of 1.58 or more, an Abbe's number of 35 or more and a specific gravity of 1.35 or less:

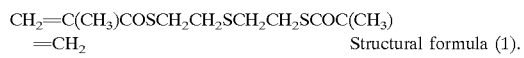

Structural formula (1).

2 Claims, No Drawings

LENS MADE OF SYNTHETIC RESIN AND PROCESS FOR PRODUCING THE SAME

This application is a 371 of PCT/JP01/07641 filed on Sep. 4, 2001, now WO 02/21165 A1 published Mar. 14, 2002, and claims priority benefits of Japanese patent applications, 2000-271994 filed Sep. 7, 2000 and 2001-213994 filed Jul. 13, 2001.

The present invention relates to a lens made of a synthetic resin, more particularly a lens made of a synthetic resin having excellent optical properties, dye-affinity and impact resistance, and comprising a photopolymerizable composition.

BACKGROUND OF THE INVENTION

One of materials for lenses of a synthetic resin is called "CR-39" produced from diethylene glycol bis-allylcarbonate as a starting material which is an early representative example for glass lenses. This material has a low refractive index of about 1.50, and hence, the lens is thick as a whole. For this reason, the above material is not satisfactory for the glass lens. Therefore, in order to make the lens thin, researches of increasing the refractive index have been extensively conducted. As a result, for example, in the case of a urethane resin material obtained by polymerizing thiol and isocyanate shown in Japanese Patent Laid-open No. 270859/1990, a refractive index of 1.60 or more is achieved, and furthermore, in the case of an episulfide resin material containing an episulfide compound shown in Japanese Patent Laid-open No. 71580/1997, a refractive index of 1.70 or more is achieved. The technique of making the lens thin has rapidly been accelerated.

However, the resin produced by the urethane polymerization of thiol and isocyanate, which is synthesized by the urethane reactions, involves several disadvantages such as inconvenience for handling because it is of two-part type, odor emitted during a lens fabrication process and insufficient moldability, in other words a product yield is low, though giving an excellent lens having the high refractive index, a high Abbe's number and impact resistance. On the other hand, the material containing the episulfide compound involves problems of impact resistance and a cost in addition to the above odor and moldability. Moreover, these resins of the high refractive index or a super high refractive index are synthesized by the urethane or episulfide-ring opening reactions, and are difficult to photopolymerize, which requires a long thermosetting time and thermal polymerization process. Therefore, production of glass lenses, taking a long time of 10 to 20 hours for the polymerization, occupies the glass mold for lens production for a long time. Massive production of the lenses, therefore, requires a great number of the glass molds and large polymerization plant, and hence a very large investment, which is one of its major disadvantages. The resins of the high refractivity or the super high refractivity have been already produced on a commercial scale by the urethane or episulfide-ring opening reactions. These processes, however, need a large investment cost, because they are based on thermal polymerization.

On the other hand, photopolymerization for producing lenses is an effective polymerization method for massively producing lenses in a short time, because it needs shorter polymerization time than thermal polymerization and can reduce the lens production time. It can give the resin for glass lenses in a polymerization time of several minutes, thus greatly reducing glass mold occupation time. Photopolymerization can repeat the lens production cycles many times while thermal polymerization gives one lens. In other words, photopolymerization, when applied to massive production of lenses, is characterized in that it needs a smaller number of glass molds and smaller polymerization facilities than thermal polymerization, and hence needs an investment cost which is not higher than that for thermal polymerization.

Photopolymerizable materials of high refractive index have been proposed, e.g., those from a prepolymer of thiol and vinyl monomer shown in Japanese Patent Laid-open No. 57831/1992, those containing a novel sulfur compound shown in Japanese Patent Laid-open No. 183816/1996, those containing a multifunctional thiomethacrylate and another polymerizable monomer as essential components shown in Japanese Patent Application Laid-open No. 26613/1989, and those containing a multifunctional thiomethacrylate and multifunctional thiol or the like shown in Japanese Patent Application Laid-open Nos. 199964/1994, 82376/1995, 302040/1997 and 324023/1997. They are materials of high refractive index, producible not only by thermal polymerization but also by photopolymerization. Some of them actually attain a refractive index of 1.60 or more.

However, commercial production of lenses of a light-curable resin as those for glasses is only limited to those of low refractive index. Those from a prepolymer of thiol and vinyl monomer shown in Japanese Patent Laid-open No. 57831/1992 can have a high refractive index, but involve a problem of requiring a complicated pre-polymerization process for photopolymerization, with the result that reduction of lens production time cannot be attained. Those containing a novel sulfur compound shown in Japanese Patent Laid-open No. 183816/1996 can have a high refractive index, but the mass production techniques therefor have not been established yet on account of their novelty. They involve a number of other problems, e.g., a high production cost needed, a high density, and insufficient impact resistance, dye-affinity, an Abbe's number and transparency among others as the properties needed by optical lenses. Those containing a multifunctional thiomethacrylate and another polymerizable monomer as essential components shown in Japanese Patent Application Laid-open No. 26613/1989 can have a high refractive index and heat resistance. However, the multifunctional monomer has a large crosslinking effect and insufficient ductility, and may cause a problem of giving a hard, fragile resin, which comes from its molecular structure and the monomer with which the multifunctional monomer is combined. Japanese Patent Application Laid-open No. 26613/1989 gives no consideration to impact resistance or dye-affinity, which are important properties in the field of glass lenses. The materials in which a multifunctional thiomethacrylate is combined with a multifunctional thiol or the like, e.g., those disclosed by Japanese Patent Laid-open Nos. 199964/1994, 82376/1995, 302040/1997 and 324023/1997, are prevented from becoming hard and fragile, because the combination of a multifunctional thiomethacrylate having a large crosslinking effect with a multifunctional thiol or the like imparts an adequate ductility to them. At the same time, they can contain sulfur at a higher proportion to simultaneously attain high refractive index and Abbe's number. However, none of these materials have been commercialized yet for lenses of high refractive index, because the combination of multifunctional thiomethacrylate with multifunctional thiol has a disadvantage of high specific gravity, coming from the high proportion of sulfur. Moreover, the combination lacks the crosslinking effect in the absence of a third component, which is caused by the multifunctional thiomethacrylate structure, with the result it involves a disadvantage of insufficient heat resistance when it keeps dye-affinity and impact resistance. Japanese Patent Application Laid-open No. 82376/1995, described earlier, discloses a method of combining a multifunctional thiomethacrylate and multifunctional thiol with another monomer, e.g., styrene or divinyl benzene. This method can decrease specific gravity of the resin by incorporating an aromatic monomer, e.g., styrene or divinyl benzene. However, incorporation of an aromatic monomer, e.g., styrene or divinyl benzene, greatly decrease Abbe's number, although it can decrease specific gravity. The method disclosed by Japanese Patent Application Laid-open No. 324023/1997 has a disadvantage of needing a complex thiourethane prepolymer production process, which complicates the overall lens production process. Japanese Patent Application Laid-open No. 302040/1997 discloses a method which uses a multifunctional thiomethacrylate, thiol and (meth)acrylate of at least trifunctionality as essential components, where use of (meth)acrylate of at least trifunctionality is for simultaneously securing heat resistance and impact resistance and dye-affinity. This method, however, involves a disadvantage of reduced working efficiency and production yield, in other words pass rate, because the multifunctional (meth)acrylate in general is highly viscous to make the lens monomer mixture highly viscous at the compositional ratio of these components to keep these properties well-balanced. It also involves other disadvantages, e.g., reduced specific gravity being unattainable, and insufficient monomer stability and shape stability, in other words softness at normal temperature, of the lens, which prevent commercialization of the method.

As discussed above, the materials of high refractive index developed so far involve disadvantages, e.g., insufficient handling- and fabrication-related properties and difficulty in photopolymerization, even when they are commercialized. Photo-polymerizable materials of high refractive index also involve disadvantages, e.g., high specific gravity and insufficient properties essential for optical lenses, e.g., handling and optical properties, impact resistance, and dye-affinity.

It is an object of the present invention to provide an optical lens material which sufficiently has properties essential for optical lenses, e.g., impact resistance and dye-affinity and which simultaneously attains a high refractive index, a high Abbe's number and a low specific gravity and which is photopolymerizable.

DISCLOSURE OF THE INVENTION

The inventors of the present invention have found, after having extensively studied to solve the above problems, that a combination of a multifunctional thiomethacrylate and a bifunctional or multifunctional thiol of specific structure, and preferably multifunctional (meth)acrylate of specific structure, can attain reduced specific gravity without damaging the properties essential for optical lenses, e.g., impact resistance and dye-affinity. As a result, they have developed a very excellent material for optical lenses, not only having a high refractive index and a high Abbe's number but also the properties essential for optical lenses, e.g., impact resistance and dye-affinity, simultaneously attaining low specific gravity, not only thermally polymerizable but also photopolymerizable, and easy to handle, reaching the present invention.

The first invention provides a lens made of a synthetic resin which is a copolymer obtained by copolymerizing a composition comprising 20 to 80% by weight of bis-2-methacryloylthioethyl sulfide represented by the following structural formula (1), 5 to 50% by weight of a bifunctional or multifunctional thiol and 0 to 75% by weight of a monomer copolymerizable with the above compounds, and which has a refractive index of 1.58 or more and an Abbe's number of 35 or more:

Structural formula (1)

The second invention provides a method of producing a lens made of a synthetic resin having a refractive index of 1.58 or more and an Abbe's number of 35 or more by photopolymerizing a composition comprising 20 to 80% by weight of bis-2-methacryloylthioethyl sulfide represented by the structural formula (1), 5 to 50% by weight of a bifunctional or multifunctional thiol and 0 to 75% by weight of a monomer copolymerizable with the above compounds.

The third invention provides a lens made of a synthetic resin which is a copolymer obtained by copolymerizing a composition comprising 20 to 80% by weight of bis-2-methacryloylthioethyl sulfide represented by the structural formula (1), 5 to 50% by weight of a bifunctional or multifunctional thiol, 5 to 50% by weight of a bifunctional (meth)acrylic compound and 0 to 75% by weight of a monomer copolymerizable with the above compounds, and which has a refractive index of 1.58 or more, an Abbe's number of 35 or more and a specific gravity of 1.35 or less.

The fourth invention provides a method of producing the lens of a synthetic resin according to the third invention.

BEST MODE OF EMBODIMENTS OF THE INVENTION

A synthetic resin for the lens of the first invention is a copolymer obtained by copolymerizing a composition comprising 20 to 80% by weight of bis-2-methacryloylthioethyl sulfide represented by the structural formula (1), 5 to 50% by weight of a bifunctional or multifunctional thiol and 0 to 75% by weight of a monomer copolymerizable with the above compounds.

The synthetic resin for the lens of the third invention is a copolymer obtained by copolymerizing, preferably by photopolymerizing, a composition comprising 20 to 80% by weight of bis-2-methacryloylthioethyl sulfide represented by the structural formula (1), 5 to 50% by weight of a bifunctional or multifunctional thiol, 5 to 50% by weight of a bifunctional (meth)acrylic compound [A] and 0 to 75% by weight of a monomer copolymerizable with the above compounds.

The first and third inventions contain bis-2-methacryloylthioethyl sulfide in an amount of 20 to 80% by weight, preferably 30 to 70%, because they are difficult to attain high refractive index as one of the properties of the present invention at a content below 20% by weight, and difficult to secure sufficient impact resistance and dye-affinity for optical lenses at a content above 80% by weight.

The first and third inventions contain the bifunctional or multifunctional thiol at 5 to 50% by weight, preferably 15 to 40%, because they can have an adequate ductility at an adequate content of the thiol, but may not have an adequate ductility at a thiol content below 5% or above 50%, with the result that they are difficult to keep sufficient impact resistance, dye-affinity and heat resistance for optical lenses.

The bifunctional or multifunctional thiols useful for the present invention include, but not limited to, bifunctional sulfur compounds, e.g., ethylene glycol bis-thioglycolate (EGTG) and thiodiethane thiol (DMDS); trifunctional sulfur compounds, e.g., trimethylolpropane tris-thioglycolate (TMTG) and trimethylolpropane tris-thiopropionate (TMTP); and tetrafunctional sulfur compounds, e.g., pentaerythritol tetrakis-thioglycolate (PETG) and pentaerythritol tetrakis-thiopropionate (PETP). Use of these thiols is not necessarily limited to one type, but a combination of two or more types may be used.

The third invention contains the bifunctional (meth) acrylic compound [A] at 5 to 50% by weight, preferably 15 to 40%, because it is difficult to attain low specific gravity as one of the properties of the present invention and also difficult to simultaneously keep impact resistance and heat at a (meth)acrylic compound content below 5%, and difficult to attain high refractive index as one of the properties of the present invention at a content above 50%.

The bifunctional (meth)acrylic compounds [A] useful for the present invention include isobornyl di(meth)acrylate, poly(ethylene glycol) di(meth)acrylate, poly(propylene glycol) di(meth)acrylate, poly(butylene glycol) di(meth)acrylate, neopentyl glycol di(meth)acrylate, neopentyl glycol di(meth)acrylhydroxypivalate, hexanediol di(meth)acrylate, 2-ethylpropanediol di(meth)acrylate, 2-butylpropanediol di(meth)acrylate, nonanediol di(meth)acrylate, 2-hydroxy-1,3-dimethacryloxypropane, 2-hydroxy-1-acryloxy-3-methacryloxypropane, dimethyloltricyclodecane di(meth)acrylate, 2,2-bis(4-((meth)acryloxy-polyethoxy)phenyl)propane, di(meth)acryl isophthalate, di(meth)acryl terephthalate, bisphenol A polyepoxy-(meth)acrylate, 1,4-bis(meth)acryloylthiobenzene, and bisphenol F polyepoxy-(meth)acrylate. Use of these bifunctional (meth) acrylate compounds [A] is not necessarily limited to one type, but a combination of two or more types may be used.

The bifunctional (meth)acrylate compound [A] is preferably selected from the above-described compounds, which are of low specific gravity and high crosslinking effect, in order to have the resin attaining low specific gravity and simultaneously keeping impact resistance and heat resistance as the characteristic properties of the present invention. In particular, incorporation of 2,2-bis(4-((meth)acryloxy-polyethoxy)phenyl)propane is very effective for attaining low specific gravity, and that of poly(ethylene glycol) di(meth)acrylate is very effective for realizing impact resistance and heat. A combination of 2,2-bis(4-((meth)acryloxy-polyethoxy)phenyl)propane and poly(ethylene glycol) di(meth)acrylate is most preferable. It should be noted that 2,2-bis(4-((meth)acryloxy-polyethoxy)phenyl)propane and poly(ethylene glycol) di(meth)acrylate preferably have a lower EO-added number, because they may lack heat resistance when their EO-added number is high. This number is preferably 10 or lower for 2,2-bis(4-((meth)acryloxy-polyethoxy)phenyl)propane, and 4 or lower for poly(ethylene glycol) di(meth)acrylate.

Next, the light-curable resins of the first and third inventions may be incorporated with another monomer copolymerizable with the above-described essential components, in order to have a variety of properties. Its content, however, is preferably limited to 0 to 75% by weight, otherwise it may be difficult to attain a high refractive index and a high Abbe's number as the properties of the present invention.

The monomer is not limited so long as it is copolymerizable with the above-described essential components. The monomers useful for the present invention include, but not limited to, monofunctional acrylic compounds, e.g., hydroxyethylacrylate (HEA), hydroxypropylacrylate (HPA) and 2-phenylphenol polyethoxyacrylate (OPP); multifunctional acrylic compounds, e.g., tetramethylol methanetriacrylate (TMM); monofunctional methacrylic compounds, e.g., hydroxyethylmethacrylate (HEMA), hydroxypropylmethlacrylate (HPMA) and benzylmethacrylate (BZMA); multifunctional methacrylic compounds, e.g., trimethylolpropane trimethacrylate (TMPT); Vinyl compounds, e.g., divinyl benzene (DVB), styrene (St) and α-methylstyrene dimmer (MSD); and allyl esters, e.g., allyl benzoate (AKA) and diallyl phthalate (DAP). Use of these monomers is not necessarily limited to one type, but a combination of two or more types may be used. A monofunctional monomer containing a cyclic structure, high in birefringence and tending to decrease an Abbe's number of the resin is not preferable for the present invention to keep the high refractive index and the high Abbe's number as the properties of the present invention. Moreover, a monofunctional monomer which may drastically decrease mechanical strength of the resin is not preferable for the present invention to keep the properties essential for optical lenses, e.g., impact resistance and dye-affinity. In other words, a monomer of non-cyclic structure and multifunctionality is more preferable. When a monomer of cyclic structure and monofunctionality is used, its content should be carefully set.

Each of the synthetic resin lenses of the first and third inventions can be obtained by radical polymerization of the composition produced by the above procedure. It is possible to sufficiently decrease viscosity of the composition to keep it sufficiently fluid by adequately setting content of each component. Therefore, it can be produced easily and at a low cost by the polymerization and forming in the same mold whose shape (e.g., plate, lens or cylinder) is designed for specific purposes.

The radical polymerization process can be selected from the known ones for the present invention. Some examples are UV-aided photopolymerization in the presence of a light sensitizer, thermal polymerization in the presence of a radical polymerization initiator, and polymerization aided with electron beams, of which UV-aided photopolymerization is more preferable in overall consideration of polymerization time and facility investment cost, because it can complete the polymerization reaction in a short time by a relatively simple system.

UV-aided photopolymerization in the presence of a light sensitizer needs relatively simple system and handling procedure, completes curing of the polymer very swiftly, and can reduce polymerization time. Therefore, it is a very excellent process, because it can produce a large quantity of the polymer in a short time, and hence at low cost and high efficiency.

The light sensitizers useful for the present invention include, but is not limited to, α-hydroxyisobutylphenone, benzoin, benzoin methyl ether, benzoin ethyl ether, benzoin isopropyl ether, benzoin isobutyl ether, thioxane, 2-chlorothioxanthone and azobisisobutylonitrile.

The lamps for emitting a UV light are classified by effective wavelength of light it emits, e.g., deep-UV lamp (250 to 350 nm), xenon lamp (400 to 500 nm) and metal halide lamp (300 to 400 nm). The lamp type is not limited for the present invention, but a metal halide lamp emitting light having an effective wavelength of 300 to 400 nm is more preferable for radical polymerization of the constituent components of the present invention in a shorter time and more efficiently.

The radical polymerization proceeds insufficiently at an insufficient UV dose, making the produced resin soft and fragile. At an excessive dose, on the other hand, the produced resin may be deteriorated by a UV light. It is therefore necessary to keep the dose at an adequate level. More specifically, the cumulative UV quantity is preferably in a range of 100 to 100,000 mj/cm$^2$ at 360 nm, more preferably 1,000 to 10,000 mj/cm$^2$.

Thermal polymerization in the presence of a radical polymerization initiator is one of the most common processes and needs a simple system and handling procedure, but involves a disadvantage of low curing rate.

Polymerization by the aid of electron beams is characterized by the copolymer product being contaminated less with impurities, because of its capacity of curing the product swiftly and polymerizing the starting composition in the absence of a catalyst or light sensitizer, but involves a disadvantage of needing a very expensive production system.

The starting composition may be incorporated beforehand with an auxiliary component, e.g., colorant or thermal stabilizer, as required. The copolymer product surface may be coated with a hard coating agent, non-reflective coating agent or the like.

The light-curable resin of the present invention is the copolymer produced by the method described above, and can be produced by cutting a copolymer shape, e.g., plate, into a desired shape, in addition to casting polymerization.

The present invention is described in more detail by examples, which by no means limit the present invention. The properties of the resins prepared in the examples were determined by the following procedures:

Refractive Index

A test piece, 10 by 20 by 3 mm, was measured at room temperature (20° C.) by an analyzer (Atago's DR-M2) with α-bromonaphthalene as the contacting solution.

Abbe's Number

The Abbe's number was determined using the analyzer and procedure similar to those for refractive index.

Specific Gravity

A test piece, 10 by 20 by 3 mm, was measured by an analyzer (Mettler-Toledo's SGM-6).

Impact Resistance

A total of 10 test pieces (diameter: 78 mm, radius: 0.1 m and thickness at the center: 2 mm) were subjected to the falling ball impact test, where a steel ball (weight: 16.2 g, and diameter: 10/16 inches) was dropped onto the test piece from a height of 1.27 m. The resin was evaluated to fail the FDA falling ball impact strength standard, unless all of the 10 pieces were not cracked.

Dye-affinity

The lens was immersed in a stain solution comprising 1 g of Seiko's Seiko plux brown and 1 g of an aid dissolved in 1000 ml of pure water, kept at 92° C. for 10 minutes to be dyed. It was then measured by a UV/visible spectrophotometry (Shimadzu's UV-2200) for its transmittance of light of all wavelengths as the measure for dye-affinity. The passing mark was 40% or less.

Transparency

The test piece, which was a flat plate having a thickness of 2.00 mm at the center, was measured for haze as the measure for transparency by an analyzer (Suga Test Instruments' HGM-2DP). The passing mark was 0.3 or less.

EXAMPLE 1

50 g of bis-2-methacryloylthioethyl sulfide (TES), 20 g of pentaerythritol tetrakis-thiopropionate (PETP) and 30 g of 2-hydroxy-1,3-dimethacryloxypropane (HDP) were put in a 200 mL beaker, and the mixture was incorporated with 1000 ppm of a photopolymerization initiator (Ciba-Geigy Japan's IRGACURE 184) and thoroughly stirred. The mixture was then put in a casting mold comprising 2 glass sheets and gasket, where it was irradiated with a UV light emitted from a UV irradiation device under the conditions of dose: 800 mW/cm$^2$, irradiation distance: 50 cm and irradiation time: 10 minutes for photopolymerization. The copolymer thus prepared was taken out of the mold to obtain the final product.

The formed article had good properties, as shown in Table 1: the copolymer had a refractive index of 1.58 or more, an Abbe's number of 35 or more and a specific gravity of 1.35 or less, and was excellent in impact resistance, dye-affinity and transparency.

EXAMPLES 2 AND 3

The polymerization composition given in Table 1 was incorporated with 1000 ppm of a photopolymerization initiator (Ciba-Geigy Japan's IRGACURE 184) and thoroughly stirred in each of EXAMPLES 2 and 3. The mixture was then put in a casting mold comprising 2 glass sheets and gasket, where it was irradiated with a UV light emitted from a UV irradiation device under the conditions of dose: 800 mW/cm$^2$, irradiation distance: 50 cm and irradiation time: 10 minutes for photopolymerization. The copolymer thus prepared was taken out of the mold to obtain the final product.

The formed article had good properties, as shown in Table 1: the copolymer had a refractive index of 1.58 or more, an Abbe's number of 35 or more and a specific gravity of 1.35 or less, and was excellent in impact resistance, dye-affinity and transparency.

EXAMPLES 4 TO 6

The polymerization composition given in Table 1 was incorporated with 0.1 g of 2,2-azobis(2,4-dimethylvaleronitrile) as a radical polymerization initiator and thermally polymerized in each of EXAMPLES 4 to 6 in a casting mold comprising 2 glass sheets and gasket. The thermal polymerization was effected in a hot-wind circulating reactor, where it was heated slowly from 45° C. to 100° C. in 10 hours, at which it was held for 2 hours, and then slowly cooled to 65° C. The copolymer thus prepared was taken out of the mold to obtain the final product.

The formed article prepared in each of EXAMPLES 4 to 6 had good properties, as shown in Table 1: the copolymer had a refractive index of 1.58 or more, an Abbe's number of 35 or more and a specific gravity of 1.35 or less, and was excellent in impact resistance, dye-affinity and transparency.

Comparative Example 1

The composition was prepared as the one containing bis-2-methacryloylthioethyl sulfide at below 20% by weight, as shown in Table 1, and thermally polymerized under the conditions similar to those adopted in the above-described examples. The resin produced was confirmed to have an insufficient refractive index of below 1.58.

Comparative Example 2

The composition was prepared as the one containing bis-2-methacryloylthioethyl sulfide at above 80% by weight, as shown in Table 1, and photopolymerized under the conditions similar to those adopted in the above-described examples. The resin produced was confirmed to have an insufficient impact resistance and dye-affinity.

Comparative Example 3

The composition was prepared as the one containing a multifunctional thiol at above 50% by weight, as shown in Table 1, and thermally polymerized under the conditions similar to those adopted in the above-described examples. The resin produced lacked mechanical strength to an extent adopted in the above-described examples. The resin produced was confirmed to have insufficient impact resistance and dye-affinity.

TABLE 1

|  |  | EXAMPLES |  |  |  |  |  | COMPARATIVE EXAMPLES |  |  |  |  |  |
|---|---|---|---|---|---|---|---|---|---|---|---|---|---|
|  |  | 1 | 2 | 3 | 4 | 5 | 6 | 1 | 2 | 3 | 4 | 5 | 6 |
| Compositions | TES | 50 | 50 | 50 | 50 | 50 | 50 | 10 | 90 | 40 | 10 | 39 | 60 |
|  | EGTG | — | 20 | — | 20 | — | 20 | 20 | — | — | 10 | 1 | — |
|  | PETP | 20 | — | 20 | — | 20 | — | — | 10 | 60 | — | — | — |
|  | BPE | — | — | — | — | 5 | — | — | — | — | — | — | 40 |
|  | HDP | 30 | — | 15 | 15 | 15 | — | 30 | — | — | — | — | — |
|  | TMPT | — | 30 | 15 | 15 | — | 20 | 30 | — | — | 80 | 50 | — |
|  | St | — | — | — | — | 10 | 10 | 10 | — | — | — | 10 | — |
| Physical Properties | Refractive index | 1.582 | 1.586 | 1.583 | 1.584 | 1.593 | 1.592 | 1.550 | 1.522 |  | 1.528 | 1.566 | 1.597 |
|  | Abbe's number | 40.4 | 40.8 | 40.2 | 40.4 | 38.6 | 38.8 | 39.6 | 46.6 | Immeasurable | 48.2 | 39.8 | 36.9 |
|  | Specific gravity | 1.332 | 1.335 | 1.333 | 1.334 | 1.302 | 1.302 | 1.298 | 1.324 |  | 1.322 | 1.288 | 1.312 |
|  | Impact resistance | Good | Good | Good | Good | Good | Good | Good | Bad |  | Bad | Bad | Bad |
|  | Dye-affinity | Good | Good | Good | Good | Good | Good | Good | Bad |  | Bad | Bad | Bad |
|  | Transparency | Good | Good | Good | Good | Good | Good | Good | Good |  | Good | Good | Good |
| Polymerization method |  | Photopolymerization | Photopolymerization | Photopolymerization | Thermal polymerization | Thermal polymerization | Thermal polymerization | Thermal polymerization | Photopolymerization | Thermal polymerization | Photopolymerization | Thermal polymerization | Photopolymerization |

TES: Bis-2-methacryloylthioethyl sulfide
EGTG: Ethylene glycol bisthioglycolate
PETP: Pentaerythritol tetrakisthiopropionate
BPE: Bismethacryloxy polyethoxyphenylpropane
HDP: 2-Hydroxy-1,3-dimethacryloxypropane
TMPT: Trimethylolpropane tristhiopropionate
St: Styrene that it was soft even at room temperature and could not be measured for refractive index and other properties.

Comparative Example 4

The composition was prepared as the one containing the major components at the contents given in Table 1: bis-2-methacryloylthioethyl sulfide and a bifunctional thiol at a total content of below 25% by weight and a monomer copolymerizable with the above compounds at above 75% by weight. It was photopolymerized under the conditions similar to those adopted in the above-described examples. The resin produced was confirmed to have an insufficient refractive index of below 1.58, and also insufficient impact resistance and dye-affinity.

Comparative Example 5

The composition was prepared as the one containing a bifunctional thiol at below 5% by weight, as shown in Table 1, and thermally polymerized under the conditions similar to those adopted in the above-described examples. The resin produced was confirmed to have an insufficient refractive index of below 1.58, and also insufficient impact resistance and dye-affinity.

Comparative Example 6

The composition was prepared as the one containing only bis-2-methacryloylthioethyl sulfide and a polymerizable monomer of cyclic structure, as shown in Table 1, and photopolymerized under the conditions similar to those adopted in the above-described examples. The resin produced was confirmed to have insufficient impact resistance and dye-affinity.

EXAMPLE 7

60 g of bis-2-methacryloylthioethyl sulfide (TES), 20 g of pentaerythritol tetrakis-thiopropionate (PETP), 10 g of polyethylene glycol dimethacrylate (4G) and 10 g of bismethacryloxy polyethoxyphenylpropane (BPE200) were put in a 200 mL beaker, and the mixture was incorporated with 1000 ppm of a photopolymerization initiator (Ciba-Geigy Japan's IRGACURE 184) and thoroughly stirred. The mixture was then put in a casting mold comprising 2 glass sheets and gasket, where it was irradiated with a UV light emitted from a UV irradiation device under the conditions of dose: 800 $mW/cm^2$, irradiation distance: 50 cm and irradiation time: 10 minutes for photopolymerization. The copolymer thus prepared was taken out of the mold to obtain the final product.

The formed article had good properties, as shown in Table 2: the copolymer had a refractive index of 1.58 or more, an Abbe's number of 35 or more and a specific gravity of 1.35 or less, and was excellent in impact resistance, dye-affinity and transparency.

EXAMPLES 8 TO 12

The polymerization composition given in Table 1 was incorporated with 1000 ppm of a photopolymerization initiator (Ciba-Geigy Japan's IRGACURE 184) and thoroughly stirred in each of EXAMPLES 8 to 12. The mixture was then put in a casting mold comprising 2 glass sheets and gasket, where it was irradiated with a UV light emitted from a UV irradiation device under the conditions of dose: 800 $mW/cm^2$, irradiation distance: 50 cm and irradiation time: 10 minutes for photopolymerization. The copolymer thus prepared was taken out of the mold to obtain the final product.

The formed article had good properties, as shown in Table 2: the copolymer had a refractive index of 1.58 or more, an Abbe's number of 35 or more and a specific gravity of 1.35 or less, and was excellent in impact resistance, dye-affinity and transparency.

Comparative Example 7

The composition was prepared as the one containing bis-2-methacryloylthioethyl sulfide at below 20% by weight, as shown in Table 2, and thermally polymerized under the conditions similar to those adopted in the above-described examples. The resin produced was confirmed to have an insufficient refractive index of below 1.58.

Comparative Example 8

The composition was prepared as the one containing bis-2-methacryloylthioethyl sulfide at above 80% by weight, as shown in Table 2, and photopolymerized under the conditions similar to those adopted in the above-described examples. The resin produced was confirmed to have an insufficient impact resistance and dye-affinity.

Comparative Example 9

The composition was prepared as the one containing a bifunctional thiol at above 50% by weight, as shown in Table 2, and photopolymerized under the conditions similar to those adopted in the above-described examples. The resin produced lacked mechanical strength to an extent that it was soft even at room temperature and could not be measured for refractive index and other properties.

Comparative Example 10

The composition was prepared as the one containing bis-2-methacryloylthioethyl sulfide and a multifunctional thiol at a total content of below 25% by weight and a monomer copolymerizable with the above compounds at above 75% by weight, as shown in Table 2, and photopolymerized under the conditions similar to those adopted in the above-described examples. The resin produced was confirmed to have an insufficient refractive index of below 1.58, and also insufficient impact resistance and dye-affinity.

Comparative Example 11

The composition was prepared as the one containing a bifunctional thiol at below 5% by weight, as shown in Table 2, and photopolymerized under the conditions similar to those adopted in the above-described examples. The resin produced was confirmed to have an insufficient refractive index of below 1.58, and also insufficient impact resistance and dye-affinity.

Comparative Example 12

The composition was prepared as the one containing only bis-2-methacryloylthioethyl sulfide and a polymerizable monomer of cyclic structure, as shown in Table 2, and photopolymerized under the conditions similar to those adopted in the above-described examples. The resin produced was confirmed to have an insufficient Abbe's number of 35 or less, and also insufficient impact resistance and dye-affinity.

TABLE 2

| | | EXAMPLES | | | | | | COMPARATIVE EXAMPLES | | | | | |
|---|---|---|---|---|---|---|---|---|---|---|---|---|---|
| | | 7 | 8 | 9 | 10 | 11 | 12 | 7 | 8 | 9 | 10 | 11 | 12 |
| Compositions | TES | 60 | 40 | 50 | 50 | 60 | 60 | 15 | 90 | 40 | 10 | 40 | 55 |
| | 4G | 10 | 15 | 15 | 10 | — | 20 | 30 | — | 5 | 2 | 28 | — |
| | BPE200 | 10 | 15 | 15 | 10 | 20 | — | 30 | 5 | — | — | 28 | 45 |
| | EGTG | 20 | — | — | 20 | — | 20 | 25 | — | 55 | — | 4 | — |
| | PETP | — | 30 | 20 | — | 20 | — | — | 5 | — | 10 | — | — |
| | TMPT | — | — | — | 10 | — | — | — | — | — | 78 | — | — |
| Physical Properties | Refractive index | 1.594 | 1.582 | 1.587 | 1.584 | 1.600 | 1.590 | 1.560 | 1.618 | | 1.528 | 1.570 | 1.593 |
| | Abbe's number | 41.2 | 41.4 | 39.6 | 41.8 | 37.2 | 41.8 | 39.8 | 36.6 | Immeasurable | 48.8 | 36.8 | 34.8 |
| | Specific gravity | 1.326 | 1.336 | 1.322 | 1.332 | 1.298 | 1.340 | 1.322 | 1.326 | | 1.348 | 1.308 | 1.268 |
| | Impact resistance | Good | Good | Good | Good | Good | Good | Good | Bad | | Bad | Bad | Bad |
| | Dye-affinity | Good | Good | Good | Good | Good | Good | Good | Bad | | Bad | Bad | Bad |
| | Transparency | Good | Good | Good | Good | Good | Good | Good | Good | | Good | Good | Good |

TES: Bis-2-methacryloylthioethyl sulfide
4G: Polyethylene glycol dimethacrylate (EO-added number: 4)
BPE200: Bismethacryloxy polyethoxyphenylpropane (EO-added number: 4)
EGTG: Ethylene glycol bisthioglycolate
PETP: Pentaerythritol tetrakisthiopropionate
TMPT: Trimethylolpropane tristhiopropionate

APPLICABILITY FOR INDUSTRIAL USE

The present invention allows massive production of a very excellent lens of synthetic resin, which not only attains a high refractive index and a high Abbe's number and a low specific gravity simultaneously but also sufficiently has the properties essential for optical lenses, e.g., impact resistance and dye-affinity, easily in a short time by a simple process, e.g., photopolymerization.

What we claim is:

1. A lens comprising a synthetic resin, said synthetic resin being a copolymer obtained by copolymerizing a composition comprising:

30 to 70% by weight of a bis-2-methacryloylthioethyl sulfide of the formula $CH_2=C(CH_3)COSCH_2CH_2SCH_2CH_2SCOC(CH_3)+CH_2$;

15 to 40% by weight of a bifunctional or multifunctional thiol;

15 to 40% by weight of a bifunctional (meth)acrylic compound [A]; and 0 to 75% by weight of a monomer copolymerizable with these compounds, wherein said lens has a refractive index of 1.58 or more, an Abbe's number of 35 or more and a specific gravity of 1.35 or less, and wherein said bifunctional (meth)acrylic compound [A] is one or more compounds selected from the group consisting of poly(ethylene glycol) di(meth)acrylate, poly(propylene glycol) di(meth)acrylate, poly(butylene glycol) di(methacrylate), neopentyl glycol di(meth)acrylate, neopentyl glycol di(meth)acrylhydroxypivalate, hexanediol di(meth)acrylate, 2-ethylpropanediol di(meth)acrylate, 2-butylpropanediol di(meth)acrylate, nonanediol di(meth)acrylate, 2-hydroxy-1,3-dimethacryloxypropane, 2-hydroxy-1-acryloxy-3-methacryloxypropane, 2,2-bis(4-((meth)acryloxy-polyethoxy)phenyl)propane, di(meth)acryl isophthalate, di(meth)acryl terephthalate, bisphenol A polyepoxy-(meth)acrylate, 1,4-bis(meth)acryloylthiobenzene, and bisphenol F polyepoxy-(meth)acrylate.

2. The lens according to claim 1, wherein said bifunctional (meth)acrylic compound [A] is a combination of 2,2-bis(4-((meth)acryloxy-polyethoxy)phenyl)propane and poly(ethylene glycol) di(meth)acrylate.

* * * * *